(12) United States Patent
Plamondon et al.

(10) Patent No.: US 11,174,732 B1
(45) Date of Patent: Nov. 16, 2021

(54) ROTARY ENGINE LUBRICATION SYSTEM USING INTENSIFIER INJECTOR

(71) Applicant: PRATT & WHITNEY CANADA CORP., Longueuil (CA)

(72) Inventors: Etienne Plamondon, Candiac (CA); Sebastien Bergeron, St-Bruno-de-Montarville (CA); Jean Thomassin, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/872,937

(22) Filed: May 12, 2020

(51) Int. Cl.
| | | |
|---|---|---|
| *F01C 21/04* | (2006.01) | |
| *F02M 47/02* | (2006.01) | |
| *F02B 55/08* | (2006.01) | |
| *F02B 55/16* | (2006.01) | |
| *F02M 57/02* | (2006.01) | |
| *F02B 53/00* | (2006.01) | |
| *F02M 59/46* | (2006.01) | |
| *F02M 59/10* | (2006.01) | |

(52) U.S. Cl.
CPC ............ *F01C 21/045* (2013.01); *F01C 21/04* (2013.01); *F02B 55/08* (2013.01); *F02B 55/16* (2013.01); *F02M 47/027* (2013.01); *F02B 2053/005* (2013.01); *F02M 57/025* (2013.01); *F02M 59/105* (2013.01); *F02M 59/466* (2013.01)

(58) Field of Classification Search
None
See application file for complete search history.

(56) References Cited

U.S. PATENT DOCUMENTS

| | | | | |
|---|---|---|---|---|
| 3,994,642 A * | 11/1976 | Johannes | ................. | F01C 21/18 418/99 |
| 5,143,291 A * | 9/1992 | Grinsteiner | .......... | F02M 57/025 123/446 |
| 6,526,943 B2 * | 3/2003 | Augustin | ............. | F02M 57/025 123/446 |
| 6,631,853 B2 * | 10/2003 | Lenk | .................... | F02M 55/007 239/88 |
| 6,655,602 B2 * | 12/2003 | Shafer | .................. | F02M 47/043 123/446 |
| 6,715,694 B2 * | 4/2004 | Gebhardt | ............. | F02M 57/025 137/625.65 |

(Continued)

*Primary Examiner* — Kevin R Steckbauer
(74) *Attorney, Agent, or Firm* — Norton Rose Fulbright Canada LLP

(57) ABSTRACT

A rotary internal combustion engine (ICE) has: a housing defining a rotor cavity; a rotor received within the rotor cavity to define working chambers of variable volume around the rotor, the rotor having circumferentially spaced peripheral apex seals biased radially outwardly in sliding engagement against a peripheral wall of the housing to separate the working chambers from one another, the housing having a fluid passage defined therethrough and opening into an inner surface of the peripheral wall; and an injector having a lubricant inlet hydraulically connected to a lubricant source, an actuation inlet hydraulically connected to a source of an actuation fluid, and a lubricant outlet, the injector having an open state in which the lubricant outlet is in fluid flow communication with the fluid passage upon the actuation fluid received within the injector and a closed state in which the lubricant outlet is disconnected from the fluid passage.

20 Claims, 3 Drawing Sheets

(56) References Cited

U.S. PATENT DOCUMENTS

| | | | | |
|---|---|---|---|---|
| 8,366,018 | B1* | 2/2013 | Giordano | F02M 57/026 |
| | | | | 239/88 |
| 9,562,497 | B2* | 2/2017 | Coldren | F02M 21/0257 |
| 10,570,789 | B2* | 2/2020 | Schulz | F01M 5/002 |
| 2015/0369177 | A1* | 12/2015 | Coldren | F02M 63/0026 |
| | | | | 123/294 |
| 2017/0362974 | A1* | 12/2017 | Schulz | F02B 53/00 |
| 2020/0157985 | A1* | 5/2020 | Schulz | F02B 55/08 |
| 2020/0284232 | A1* | 9/2020 | Furukawa | F02M 69/462 |

\* cited by examiner

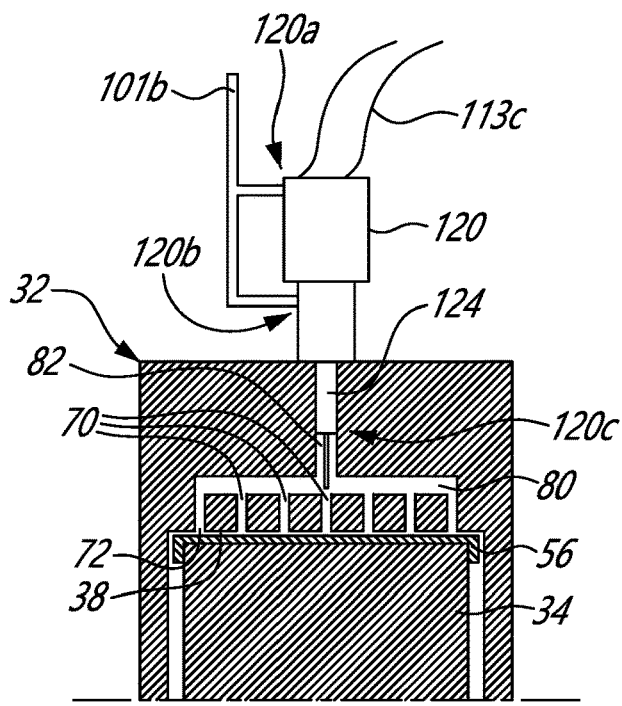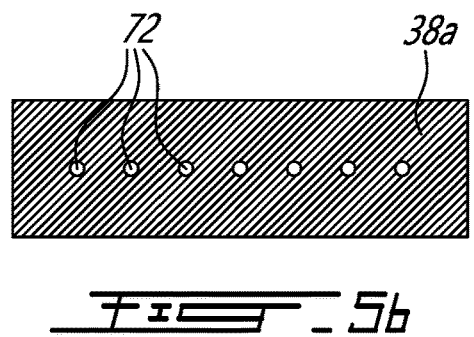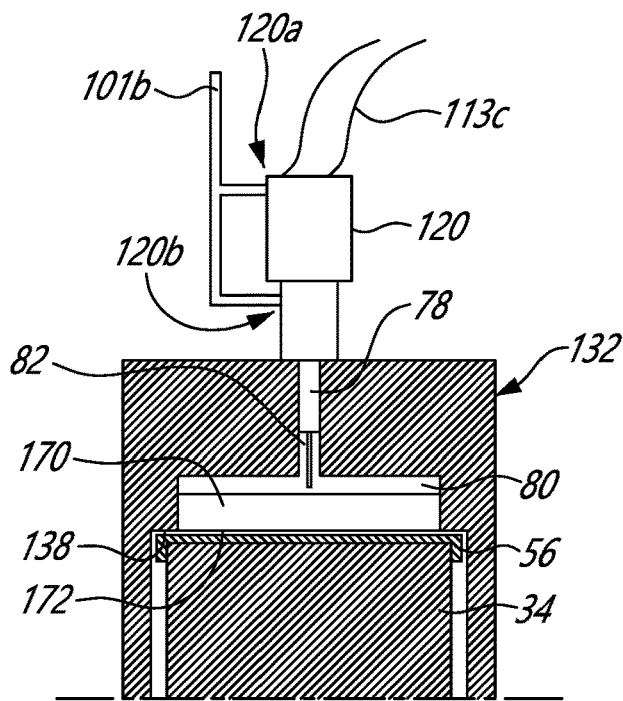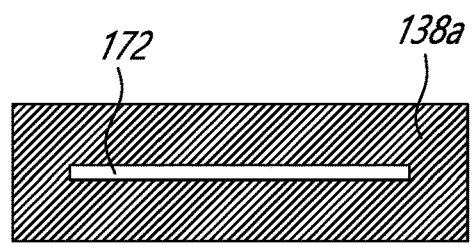

ROTARY ENGINE LUBRICATION SYSTEM USING INTENSIFIER INJECTOR

TECHNICAL FIELD

The application relates generally to aircraft engines and, more particularly, to lubrication systems used in such engines.

BACKGROUND

Rotary internal combustion engines, such as Wankel engines, having peripheral seals, such as apex seals, require seal lubrication. Typically, such engines use a mechanical lubricant pump driven by a rotatable shaft of the engine to deliver the lubricant to the seals However, since such mechanical pumps are driven by the engine, the frequency of injection of the lubricant is function of the rotational speed of the rotatable shaft which may not always be optimal.

SUMMARY

In one aspect, there is provided a rotary internal combustion engine (ICE) comprising: a housing defining a rotor cavity; a rotor rotationally received within the rotor cavity to define a plurality of working chambers of variable volume around the rotor, the rotor having circumferentially spaced peripheral apex seals biased radially outwardly in sliding engagement against a peripheral wall of the housing to separate the working chambers from one another, the housing having a fluid passage defined therethrough and opening into an inner surface of the peripheral wall; and an injector having a lubricant inlet hydraulically connected to a lubricant source, an actuation inlet hydraulically connected to a source of an actuation fluid, and a lubricant outlet, the injector having an open state in which the lubricant outlet is in fluid flow communication with the fluid passage upon the actuation fluid received within the injector and a closed state in which the lubricant outlet is disconnected from the fluid passage.

In another aspect, there is provided a method of lubricating apex seals of a rotor of a rotary internal combustion engine having a housing defining a cavity rotationally receiving the rotor, the apex seals biased against the housing, the method comprising: receiving lubricant within an injector hydraulically connected to a fluid passage defined through the housing; pushing the received lubricant out of an lubricant outlet of the injector with an actuation fluid received within the injector; and injecting the received lubricant into the fluid passage defined through the housing.

DESCRIPTION OF THE DRAWINGS

Reference is now made to the accompanying figures in which:

FIG. 5a is a schematic cross-sectional view of a portion of a housing of the rotary engine of in FIG. 1 taken in plane perpendicular to that of FIG. 1;

FIG. 5b is a schematic plan view of an inner surface of a peripheral wall of the portion of the housing of FIG. 5a;

FIG. 6a is a schematic cross-sectional view of a portion of a housing of a rotary engine such as shown in FIG. 1 in accordance with another embodiment, taken in plane perpendicular to that of FIG. 1; and FIG. 6b is a schematic plan view of an inner surface of a peripheral wall of the portion of the housing of FIG. 6a.

DETAILED DESCRIPTION

Figure 1:
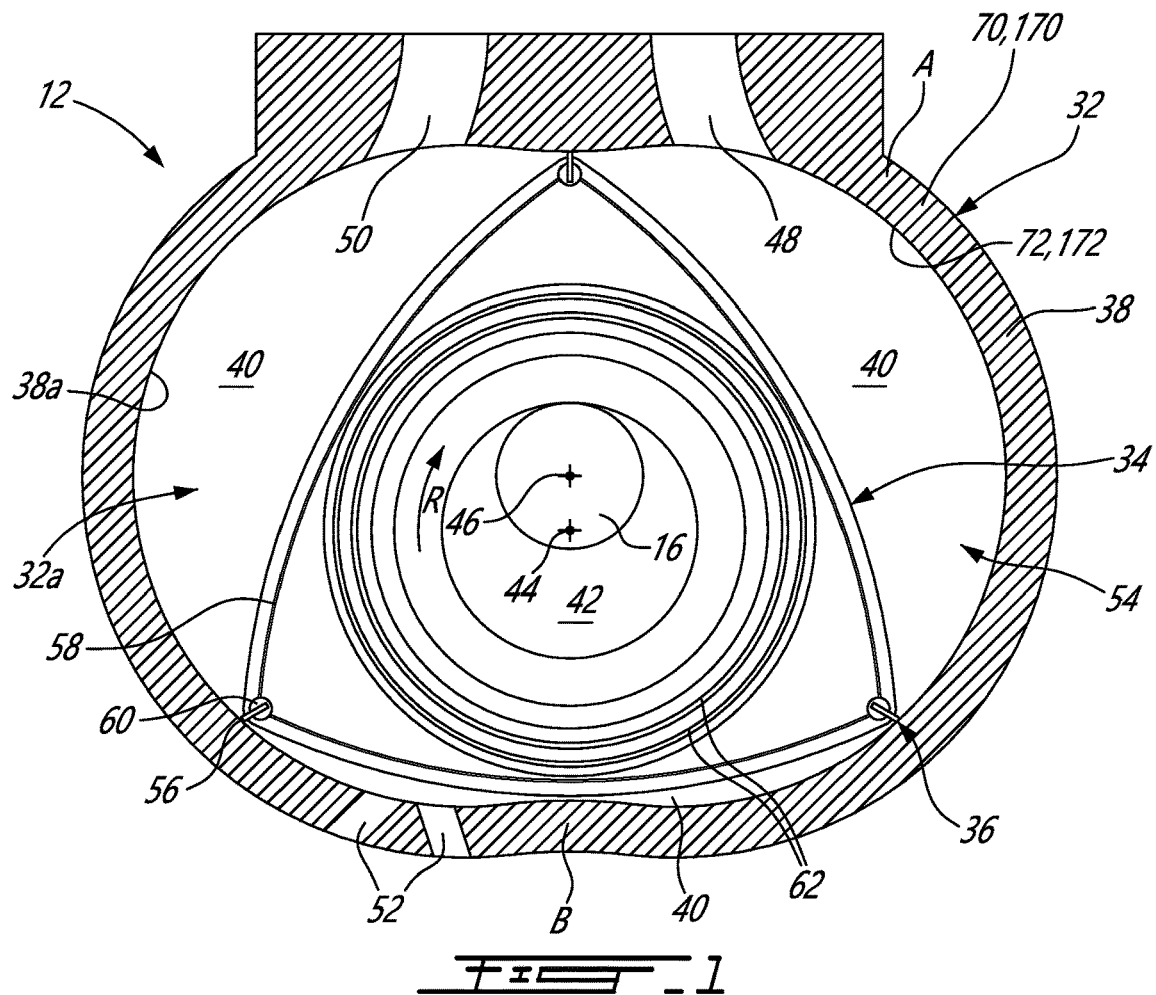
FIG. 1 is a schematic cross-sectional view of a rotary internal combustion engine in accordance with one embodiment, taken in a plane perpendicular to an axial direction of the engine.

Referring to FIG. 1, an example of a rotary intermittent internal combustion engine of the type known as a Wankel engine is shown generally at 12. It is understood that the configuration of the engine 12, e.g. placement of ports, number and placement of seals, etc., may vary from that of the embodiment shown. The engine 12 comprises a housing 32 defining a rotor cavity 32a having a profile defining two lobes, which is preferably an epitrochoid. A rotor 34 is received within the rotor cavity 32a. The rotor 34 defines three circumferentially-spaced apex portions 36, and a generally triangular profile with outwardly arched sides. The apex portions 36 are in sealing engagement with an inner surface 38a of a peripheral wall 38 of the housing 32 to form and separate three working chambers 40 of variable volume between the rotor 34 and the housing 32. The peripheral wall 38 extends between two axially spaced apart end walls 54 to enclose the rotor cavity 32a.

The rotor 34 is engaged to an eccentric portion 42 of an output shaft 16 to perform orbital revolutions within the rotor cavity 32a. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the rotor cavity 32a to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug or other ignition mechanism, as well as for one or more fuel injectors of a fuel injection system (not shown in FIG. 1) are also provided through the peripheral wall 38. Alternately, the intake port 48, the exhaust port 50 and/or the passages 52 may be provided through the end or side wall 54 of the housing. A subchamber (not shown) may be provided in communication with the chambers 40, for pilot or pre injection of fuel for combustion.

For efficient operation the working chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42. In a particular embodiment which may be particularly but not exclusively suitable for low altitude, the engine 12 has a volumetric compression ratio of from 6:1 to 8:1.

The fuel injector(s) of the engine 12, which in a particular embodiment are common rail fuel injectors, communicate with a source of Heavy fuel (e.g. diesel, kerosene (jet fuel), equivalent biofuel), and deliver the heavy fuel into the engine 12 such that the combustion chamber 40 is stratified with a rich fuel-air mixture near the ignition source and a leaner mixture elsewhere.

Figure 2:
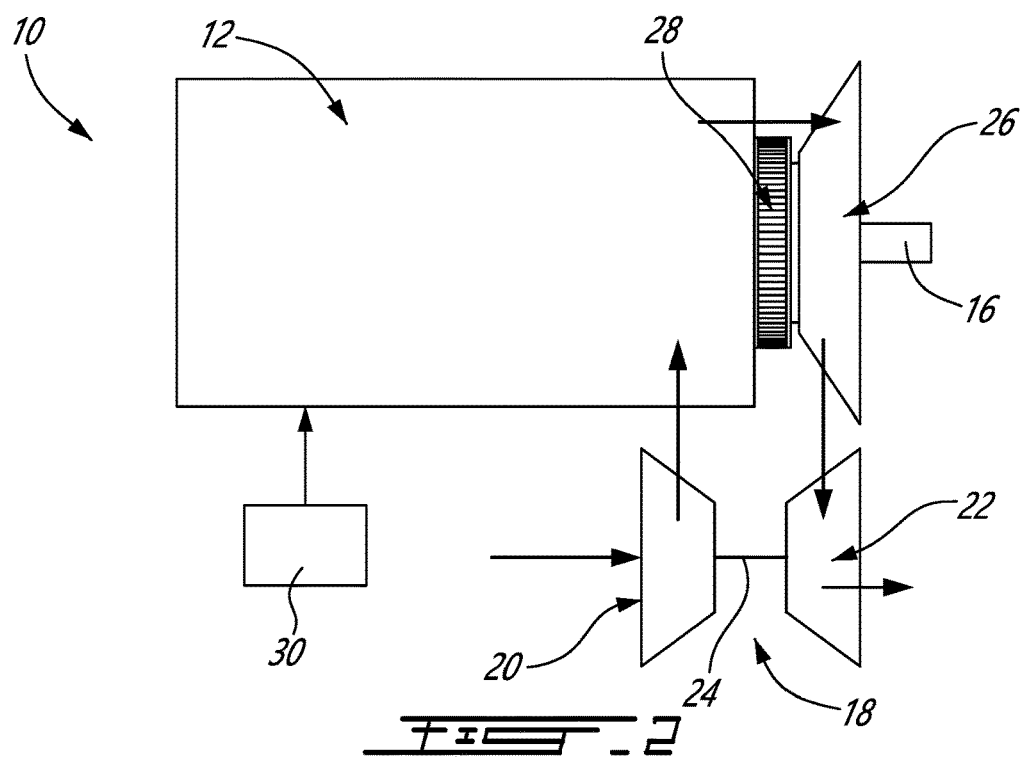
FIG. 2 is a schematic representation of a compound cycle engine comprising the rotary internal combustion engine of FIG. 1.

Referring now to FIG. 2, the rotary engine 12 is used in a compound cycle engine 10, where one or more rotary engines 12 drive a common load connected to the output shaft 16. The compound cycle engine 10 also includes a turbocharger 18, including a compressor 20 and a turbine 22 which are drivingly interconnected by a shaft 24, with the compressor 20 of the turbocharger 18 compressing the air before it enters the rotary engines(s) 12. The exhaust flow from the rotary engine(s) 12 is supplied to a compound turbine 26 in fluid communication therewith, also driving the common load, for example connected to the output shaft 16 through an appropriate type of transmission 28. The exhaust flow from the first stage turbine 26 is supplied to the second stage turbine 22 of the turbocharger 18.

Alternately, the rotary engine 12 may be used without the turbocharger 18 and/or without the compound turbine 26, and with or without one or more other rotary engine(s) 12 engaged to the same output shaft 16. In a particular embodiment, the rotary engine 12 is used as or part of an automobile engine. In a particular embodiment, the rotary engine 12 is used as or part of an aircraft engine (prime mover engine or APU).

Rotary engines require oil injection to the apex seals 56 to prevent excessive wear and loss of performance. Typically, rotary engines use a mechanical oil metering pump driven by the engine. A mechanical pump is limited in flexibility as the frequency of injection is usually fixed for a given engine speed and it is difficult to independently vary frequency without a change in quantity injected.

Figure 3:
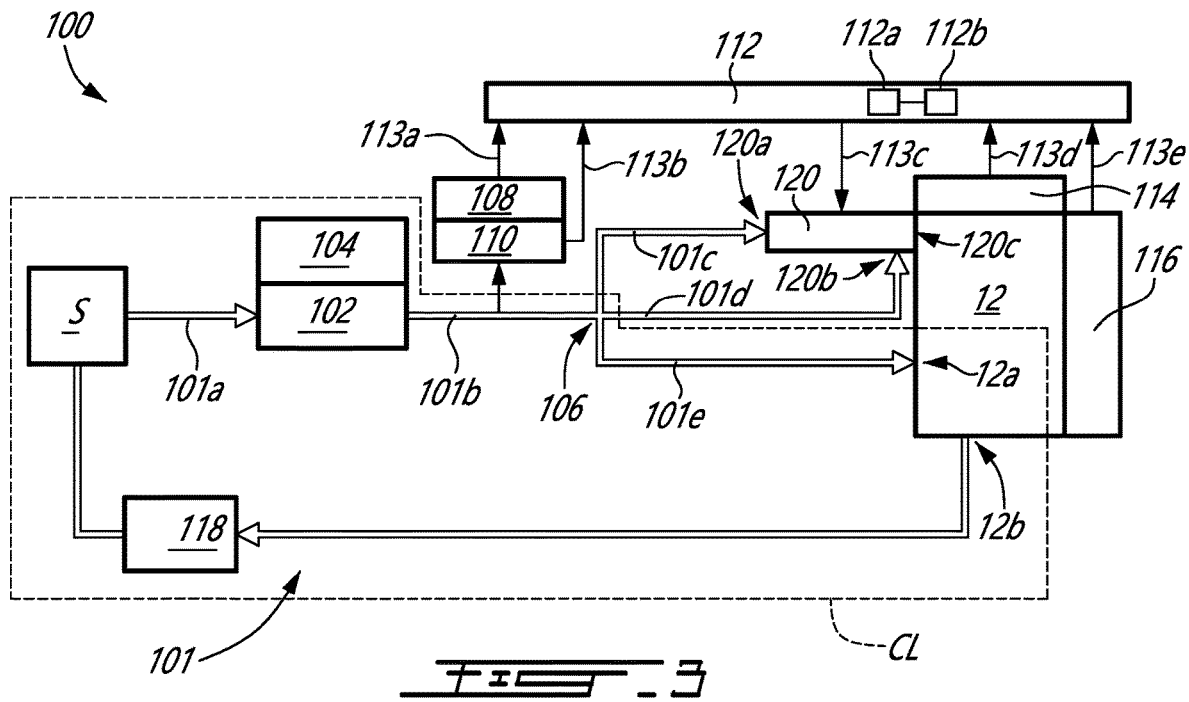
FIG. 3 is a schematic view of a lubrication system of the rotary internal combustion engine of FIG. 1.

Referring now to FIG. 3, a lubrication system for the rotary engine 12 of FIG. 1 is shown generally at 100. The lubrication system 100 includes an oil circuit 101 including conduits and an oil source S, which may be an oil tank. It will be appreciated that the oil source may be a source of any suitable lubricant. The oil source S is hydraulically connected to a low-pressure oil pump 102 via suitable conduit 101a of the oil circuit 101. The low-pressure oil pump 102 is operable to draw oil from the oil source S. In the embodiment shown, the low-pressure pump 102 increases a pressure of oil flowing therethrough to about 100 PSI. A pressure regulating valve 104 is hydraulically connected to the pump 102 and is operable to ensure that the pump 102 delivers oil at a substantially constant pressure throughout an operating envelope of the engine 12. Any suitable pressure regulating valve may be used. Such a valve typically includes a calibrated spring that maintains an outlet port of the valve close when the desired pressure is achieved and that opens the outlet port upon the pressure exceeding a given threshold.

In the embodiment shown, the pump 102 is hydraulically connected to a splitter 106, which is located downstream of the pump 102, via a suitable conduit 101b of the oil circuit 101. In the embodiment shown, the splitter 106 has an inlet hydraulically connected to the low-pressure pump 102 and three outlets each hydraulically connected to a respective one of two inlets 120a, 120b of the injector 120 and to an engine oil inlet 12a of the rotary engine 12 via respective conduits 101c, 101d, 101e of the oil circuit 101. It will be appreciated that each of the conduits 101c, 101d, 101e of the oil circuit 101 that are connected to the splitter 106 may alternatively be directly hydraulically connected to the low-pressure pump 102.

As shown in FIG. 3, oil is injected into the rotary engine 12 via the engine oil inlet 12a. This oil is used to lubricate internal components of the rotary engine 12, such as bearings. In the present case, the oil injected via the engine oil inlet 12a is not used for lubricating the apex seals 56. The oil, after lubricating the bearings, flows out of the rotary engine 12 via a scavenge outlet 12b. The scavenge outlet 12b is hydraulically connected to the oil source S via a scavenge pump 118. In the embodiment shown, a portion of the lubricating system 100 defines a closed-loop CL shown in dashed lines in FIG. 3. In other words, oil is drawn to from the oil source S, injected into the engine 12 via the engine oil inlet 12a for lubricating components such as bearings, and scavenged back to the oil source S, and so on. It will be appreciated that, with time, some of the oil may be consumed by the engine 12 and that it may be required to add oil to the lubrication system 100.

The lubrication system 100 includes one or more oil injectors 120 (only one being shown herein for convenience), that are hydraulically connected to the pump 102 and operable to inject oil at required locations within the engine 12. More detail about the oil injectors 120 are presented herein below. The oil injected by the injectors 120 is used for lubricating, for instance, the apex seals 56 (FIG. 1).

As shown in FIG. 3, a temperature sensor 108 and a pressure sensor 110 are operatively connected to the conduit 101b downstream of the pump 102 to monitor a pressure and temperature of oil flowing therethrough. A coolant temperature sensor 114 and a speed sensor 116 are operatively connected to the engine 12 for respectively measuring a temperature of a coolant flowing within the housing 32 (FIG. 1) of the engine 12 and for measuring a rotational speed of a crank shaft of the engine 12.

In the embodiment shown, the engine 12 includes an engine control unit (ECU) 112 that is operatively connected to the pressure sensor 108, the temperature sensor 110, the injector 120, the coolant temperature sensor 114, and to the speed sensor 116 via suitable respective links 113a, 113b, 113c, 113d, 113e. The links 113a, 113b, 113c, 113d, 113e may wired connections or wireless connections. The ECU 112 is operable to receive signals from the sensors 108, 110, 114, and 116 and to adjust operative parameters of the lubrication system 100 in function of the received signals. Operation of the one or more injectors 120 is controlled by the ECU 112 in function of the signals received from the sensors 108, 110, 114, and 116. More detail about operation of the ECU 112 are presented herein below.

Figure 4:
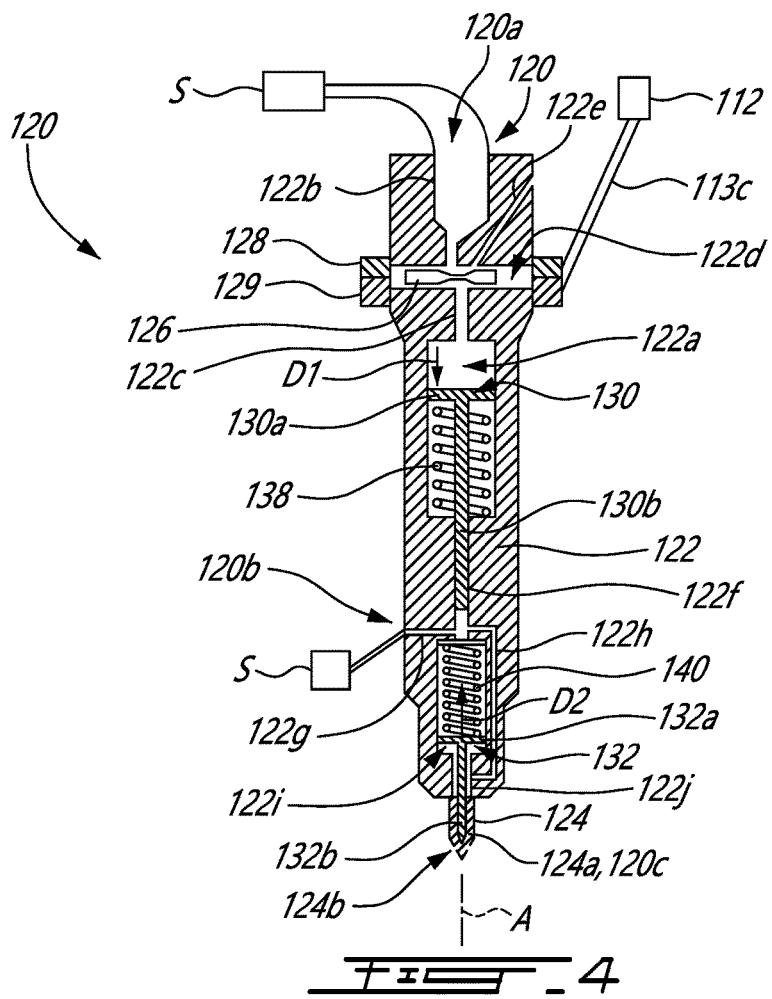
FIG. 4 is a schematic cross-sectional view of an intensifier injector according to one embodiment, which is used with the lubrication system of FIG. 3 for the engine of FIG. 1.

Referring now to FIG. 4, there is shown an exemplary embodiment of an injector 120. The injector 120 is an intensifier injector and has two inlets, namely, an actuation inlet 120a and a lubricant inlet 120b, also referred to herein below as an oil inlet. Herein, an intensifier injector refers to an injector able to create a pressure ratio between an outlet and an inlet of said injector. In the embodiment shown, the pressure ratio is greater than one such that the oil pressure at the outlet is greater than that at the inlet. Other pressure ratios are contemplated. Herein, the intensifier injector is a pressure-intensified hydraulically-actuated electronically-controlled injector. In the embodiment shown, both of the actuation inlet 120a and lubricant inlet 120b are hydraulically connected to the oil circuit 101 and both of these inlets receive oil at the same pressure. It will be appreciated that, alternatively, the actuation inlet 120a may be hydraulically connected to an independent source of an actuation fluid distinct from oil source S. For instance, the actuation fluid may be oil from another oil circuit of the engine (or that of another engine). Or, the actuation fluid may be fuel flowing within a fuel injection system of the engine 12. In a particular embodiment, a dedicated circuit for the actuation fluid is used. That is, the actuation fluid may not carry any other function than actuating the injector 120. Such a circuit may flow, for instance, an hydraulic fluid. In the embodiment shown, the source of the actuation fluid corresponds to the oil source S. The lubrication inlet 120b is hydraulically connected to the oil source S for receiving oil to be injected at the apex seals 56 for their lubrication. In the embodiment shown, an oil pressure at the actuation inlet 120a of the injector matches that at the lubrication inlet 120b of the injector 120 since they are both hydraulically connected to the low-pressure pump 102.

The injector 120 has a body 122 and a nozzle 124 protruding axially from the body 122 along an injector axis A. The actuation inlet 120a and the lubricant inlet 120b are defined in the body 122. The nozzle 124 defines a lubricant outlet 120c, referred to herein as an oil outlet, of the injector 120 via which the oil exits the injector 120 for lubricating the apex seals 56. The body 122 defines an internal actuation chamber 122a that is hydraulically connectable to the oil source S via a first internal passage 122b and a second internal passage 122c both defined in the body 122. In the embodiment shown, a spool valve 126 is slidingly received within a valve chamber 122d defined in the body 122 of the injector 120. The valve chamber 122d is located between the first and second internal passages 122b, 122c of the body 122 of the injector 120. The injector 120 has an open state in which the lubricant outlet 120c is in fluid flow communication with a fluid passage 70 (FIG. 1) upon the actuation fluid received within the injector 120 and a closed state in which the lubricant outlet 120c is disconnected from the fluid passage.

The spool valve 126 translates relative to the body 122 and within the valve chamber 122d along an axis transverse to the injector axis A. The spool valve 126 allows selective fluid communication between the oil source S and the internal chamber 122a or between the internal chamber 122a and a vent passage 122e defined by the body 122. In other words, the spool valve 126 is movable between a first position in which the oil source is hydraulically connected to the internal chamber 122a and disconnected from the vent passage 112e, and a second position in which the oil source S is disconnected from the internal chamber 122a and in which to the vent passage 122e is hydraulically connected to the internal chamber 122a for draining the oil out of the internal chamber 122a. The vent passage 122e is hydraulically connected to the oil source S for receiving oil discarded by the injector 120. Further detail about the operation of the injector 120 are presented herein below.

In the embodiment shown, an electromagnet 128 is disposed around the body 122 of the injector 120 at an axial location relative to the injector axis A that registers with the spool valve 126. The electromagnet 128 is operatively connected to the ECU 112. The ECU 112 is operable to send signals to the electromagnet 128 to magnetize said electromagnet 128 to bias the spool valve 126 in either one of the first and second positions described above. More details about the operation of the injector 120 are presented herein below.

The injector 120 has a piston assembly 130 including a piston 130a that is slidably received within the internal chamber 122a. A diameter of the piston 130a matches that of the internal comber 122a such that a sealing engagement is defined between corresponding peripheral walls of the internal chamber 122a and piston 130a. It will be appreciated that a sealing member, such as an O-ring, may be located radially between the peripheral walls of the internal chamber 122a and the piston 130a. The piston assembly 130 is movable back and forth along the injector axis A. The piston 130a is secured to a shank 130b protruding therefrom along the injector axis A. The shank 130b of the piston 130 is slidingly received within a third internal passage 122f defined by the body 122 of the injector 120. A diameter of the shank 130b matches that of the third internal passage 122f such that a sealing engagement is defined between the peripheral walls of the third internal passage 122f and shank 130b. A sealing member may be disposed therebetween.

The body 122 of the injector 120 further defines an injection fluid inlet passage 122g and an injection fluid outlet passage 122h. The injection fluid inlet passage 122g has an inlet hydraulically connected to the oil source S and an outlet hydraulically connected with the second internal passage 122f. The injection fluid outlet passage 122h has an inlet hydraulically connected to the second internal passage 122f. In the embodiment shown, a one-way valve is located in the passage 122g to limit the oil from flowing back toward the oil source via the internal passage 122g when the piston 130 is pushed down. The oil inlet 120b of the injector 120 corresponds to the inlet of the injection fluid inlet passage 122g.

The body 122 of the injector 120 further defines an injection internal chamber 122i. The injector 120 includes a needle assembly 132 axially movable relative to the injector axis A. The needle assembly 132 has a second piston 132a slidingly received within the injection internal chamber 122i and a needle 132b protrudes axially from the piston 132a. Diameters of the second piston 132a and the injection internal chamber 122i matches such that a sealing engagement is defined therebetween. Again, a sealing member may be disposed therebetween.

The needle 132b is partially received within the injection internal chamber 122i and partially received within a fourth internal passage 122j; the fourth internal passage 122j communicating with the injection internal chamber 122i and with an internal passage 124a defined by the nozzle 124. An outlet of the injection fluid outlet passage 122h is hydraulically connected the fourth internal passage 122j of the injector 120.

The needle 132b is movable along the injector axis A and relative to the body 122 of the injector 120 between a first position in which the needle 132b defines a sealing engagement with the nozzle 124 thereby limiting fluid flow communication via outlets 124b of the nozzle 124 and a second position in which the needle 132b is spaced apart from said outlets 124b thereby allowing the oil to exit the internal passage 124a of the nozzle 124. In other words, in the first position, the needle 132b is in abutment against an inner wall of the nozzle 124 to block the outlets 124b of the nozzle 124.

Operation of the injector 120 is now described. The oil is received within the injector 120 via the first internal passage 122b and allowed to fill the internal chamber 122a upon the spool valve 124 being in the first position. By filling the internal chamber 122a, pressure accumulates therein and pushes the piston 130a along the injector axis A toward the nozzle 124 in a downward direction D1. A biasing member 138 located within the internal chamber 122a is thereby compressed. By moving axially along the injector axis A, the oil that is received within the third internal passage 122f via the injection fluid inlet passage 122g is compressed by the shank 130b and pushed out of the third internal passage 122f via the injection fluid outlet passage 122h. The oil then reaches the injection internal chamber 122i via the fourth internal passage 122j. A pressure build-up is created within the injection internal chamber 122i that pushes the second piston 132a away from the nozzle 124 in an upward direction D2 and along the injector axis A thereby compressing a second biasing member 140 and creating a gap between the needle 132b and the inner wall of the nozzle 124 thereby uncovering the outlets 124b of the nozzle 124 and allowing the oil received within the injection internal chamber 122i to exit said chamber 122i via the internal passage 124a of the nozzle 124. The biasing members 138, 140 are used to bring the first and second pistons to their initial position when pressures re-equilibrate when the spool valve is brought back into the second position and injection is no longer required. The biasing members 138, 140 are calibrated to maintain a proper dynamic of the system.

When injection of the oil from the oil source S at the apex seals 56 is no longer required, the electromagnet 128 is energized to move the spool valve 126 from the first position to the second position in which fluid flow communication between the oil source S and the internal chamber 122a is limited. By being in the second position, the spool valve 126 allows the internal chamber 122a to communicate with the vent passage 122e and allows the oil to exit the internal chamber 122a. More specifically, in the second position of the spool valve 126, there is no more oil received in the internal chamber 122a from the oil source S and a fluid path is created between the internal chamber 122a and the vent passage 122e. Therefore, the first biasing member 138 is able to push on the piston 130a to decrease an effective volume of the internal chamber 122a thereby pushing the oil contained therein out of the injector 120 via the vent passage 122e. The injected oil is herein flown back to the oil source S. Other configurations are contemplated. In a particular embodiment, the oil exiting the injector 120 via the vent passage 122e may be flown for lubrication of one or more bearings of the engine 12.

As shown in FIG. 4, a cross-sectional area of the piston 130a taken along a plane normal to the injector axis A is greater than that of the shank 130b. Therefore, this difference in surface area allows the injector 120 to impart an increase in pressure between that received in the internal chamber 122a and that at the lubricant outlet 120c of the injector 120. This pressure increase varies in function of a ratio of the piston cross-sectional area to the shank cross-sectional area; the greater this ratio, the greater the pressure increase.

The injector 120 is able to control a quantity of oil injected at the apex seals 54 by varying a time duration in which the spool valve 126 remains in the first position. This time duration is calculated by the ECU 112 in function of operating parameters of the engine 12. These parameters include, for instance, the oil temperature, the oil pressure, the speed of engine 12, the coolant temperature and so on. As explained above, sensors 108, 104, 114, 116 are used to measure those parameters.

Referring to FIGS. 5a-5b, the housing 32 has at least one fluid passage 70 defined therethrough; in the embodiment shown, seven (7) axially spaced apart fluid passages 70 are defined (e.g. regularly spaced apart), for example each having a circular cross-section. Each fluid passage 70 terminates in an opening 72 defined in the portion of the inner surface 38a of the housing 32 engaging the seals 56 during rotation of the rotor 34. As can be seen more clearly in FIG. 5b, the inner surface 38a of the peripheral wall 38 thus has a respective opening 72 defining therethrough at the end of each of the fluid passages 70. During rotation of the rotor 34, the seals 56 are biased against and slide along the inner surface 38a of the peripheral wall 38, and accordingly across these openings 72.

In the embodiment shown, the housing 32 includes a manifold 80 defined therein. The lubricant outlet 120c of the injector 120 is in fluid communication with the manifold 80, by being received in an injector opening 82 defined through the housing 32 and communicating with the manifold 80. In the embodiment shown, the body 122 of the injector 120 is located outside of the housing 32 and the nozzle 124 is received within the housing 32; alternatively, the body 122 of the injector 120 may be received within the housing 32. Each fluid passage 70 opening into the inner surface 38a of the peripheral wall 38 extends from the manifold 80, in fluid communication therewith.

In the embodiment shown in FIGS. 6a-6b, the housing 132 has a single fluid passage 170 defined therethrough, shaped as an elongated slot extending along the axial direction of the engine, and defining an elongated opening 172 in the inner surface 38a of the peripheral wall 38. Again, the lubricant outlet 120c of the injector 120 is received in an injector opening 82 defined through the housing 32 and communicating with a manifold 80, and the fluid passage 170 opening into the inner surface 138a of the peripheral wall 138 extends from the manifold 80, in fluid communication therewith.

It is understood that different numbers and/or configurations of fluid passages 70, 170 may alternately be used.

In a particular embodiment where the intake port 48 is defined through the peripheral wall 38, the opening 72, 172 of each fluid passage 70, 170 is positioned after the intake port 48 and before the combustion starts, following the direction of movement of the apex seals 56 upon rotation of the rotor 34, i.e. the seals 56, in order, pass over the intake port 48, pass over the opening(s) 72, 172, and then reach the zone of combustion. For example, in a particular embodiment the opening(s) 72, 172 is/are positioned at any location from point "A" to point "B" as indicated in FIG. 1. A similar location may also be used for an engine where the intake port is defined through the end wall 54. The feed pressure to the injector 120 is adjusted based on the chamber pressure at the location of the opening 72, 172; accordingly, a higher feed pressure may be required if the seal lubricant injection is made later in the compression stroke. In a particular embodiment shown in FIG. 1, the opening(s) 72, 172 is/are defined adjacent to and after the intake port 48.

In an alternate embodiment, the seal lubricant may be injected in the top dead center section of the housing 32; however, such positioning may be more complex due to high temperature and pressure and to the presence of the high pressure fuel injection system at this location. In another alternate embodiment, the seal lubricant Injection may be performed in the expansion stroke of the engine; however, such a configuration may lead to loss of lubricant in the exhaust and/or intake port, particularly when these ports are defined through the peripheral wall. Higher temperatures of the expansion side may also cause coking of the lubricant in the fluid passage 70, 170.

A system was proposed by some of the inventors of the instant application and described in U.S. Pat. No. 10,570, 789—the entire content of which is incorporated herein by reference—that uses automotive injector valves used on gasoline direct injection (GDI) engines as a metering device for lubrication. The injector makes use of oil fed from the main oil pump at the same pressure required for engine operation in order to operate in a similar manner when used with gasoline. In the embodiment shown, the system 100 allows the frequency and quantity of delivered lubricant to be adjusted, for example based on operating conditions. In other words, in a particular embodiment, the disclosed lubrication system allows for additional benefits compared to that disclosed in U.S. Pat. No. 10,570,789. Namely, the oil feed from the main oil system is brought into two different ports of the injectors, one used for the actuation and the other one being the feed port that provides the oil to be injected into the engine. The injection command is electrically controlled and allows the oil from the actuation port to actuate an internal piston that amplifies the oil pressure from the feed port. That action pushes the oil into the oil manifold through positive displacement which may limit oil coking into the small passages 70, 170 that feed the oil on the apex seals 56. On the control aspect, the electrically controlled valve of the injectors 120 may be duplicated in order to have a redundancy on the electrical side. Furthermore, by design, using two valves may allow for diagnosis feature. When controlling one of them, the second valve can be used to validate the actuation because it is detecting the movement of the former. Therefore, if no movement is sensed, a failure is detected and the ECU 112 can switch the control to the second valve. More specifically, the injector 120 may include two electromagnets 128, the second one of the two electromagnets 128 being used for redundancy and diagnostic. That is, if the spool valve 126 moves in a direction, controlled by the first one of the electromagnets 128, the second one of the two electromagnets 128 will react to the movement of the spool valve 126 by generating a current that can be sensed by the ECU and confirm proper functionality of the electrical part.

In the embodiment shown, the disclosed lubrication system 100 allows to lubricate the apex seals 56 using oil from the same oil circuit that feeds bearings of the engine 12. A pressure of the oil flowing within the lubrication system is typically low, of the order of about 100 PSI. In the embodiment shown, using the intensifier injectors 120 allows to avoid the need of using a high-pressure pump, which increases pressure to the order of about 3000 PSI. In a particular embodiment, avoiding using a high-pressure pump allows for a simpler and more reliable lubrication system. As discussed herein above, the intensifier injector 120 is able to increase a pressure of oil it receives, in some cases, by a ratio of 10:1. In a particular embodiment, the ability of the intensifier injector 120 to increase pressure limits the risks of the outlet of the injector getting clogged— the pressure built-up generated by the injector being able to dislodge particles that may clog the nozzle outlet 124b. In a particular embodiment, the use of the intensifier injector 120 decreases an oil consumption of the engine 12 compared to a conventional configuration.

The disclosed lubrication system 100 may be used on any type of rotary engine application, including automotive. It can be used on multiple types of oil feed configuration including a direct injection configuration.

In a particular embodiment, the disclosed lubrication system 100 allows for: full authority over oil injection frequency and quantity; significant reduction of oil consumption; adaptable injection strategy function of oil pressure and temperature; more compact and lightweight installation; positive displacement feature prevents clogging of the oil passages; and redundant control valve with diagnosis feature provides failure detection and accommodation.

In a rotary engine, it is required to injected the oil in the moving chamber. Several means of reducing the oil consumption of rotary engine was tried in the past with mitigated success. The use of the above described injection system may address those drawbacks. The oil circuit of a traditional rotary engine was modified to provide oil feed to the injector 120. Since a mass flow rate of oil outputted by the injector 120 is less than a mass flow rate of fuel that would be outputted by the injector 120 if the injector 120 were used to inject fuel, cooling means are added to the injectors 120 to cool the electromagnet 128. Any suitable cooling means are contemplated, such as, for instance, a heat exchanger and cooling fluid. Some components of the injector 120 are sized to specifically accommodate the properties of the lubricant injected. In the embodiment shown, the injector 120 provides a pressure ratio of between from 2 to 4; the pressure ratio defined by the lubricant pressure at the lubricant outlet 120c to that at the lubricant inlet 120b. The intensification of the pressure is mainly used to prevent clogging of the injector 120 and therefore dormant failure, in contrast with fuel injection which requires proper spray formation and atomization.

Referring back to FIG. 4, in the embodiment shown, the ECU 112 includes a processing unit 112a operatively connected to a computer readable medium 112b. The computer readable medium 112b contains instructions executable by the processing unit 112a for receiving data from the one or more sensors 108, 110, 114, 116; determining a lubrication profile required by the apex seals 56 in function of the received data; and injecting lubricant at the apex seals 56 via the injector 120 per the determined injection profile.

In the embodiment shown, determining the lubrication profile includes determining a frequency of injection of the lubricant and an amount of lubricant to be injected. The injecting of the lubricant includes injecting the determined amount of the lubricant at the determined frequency. Herein, the injecting of the lubricant includes: injecting the actuation fluid into the actuation chamber 122a of the injector 122; pushing on the first piston 130a with the injected actuation fluid; pushing the lubricant received in the injector 120 via the lubricant inlet 120b into the injection chamber 122i with the first piston 130a; pushing on the second piston 132a with the pushed lubricant; and moving the needle 132b with the second piston 132a to allow the lubricant to exit the injector 120 via the lubricant outlet 120c.

Herein, the injecting of the actuation fluid into the actuation chamber 122a includes injecting the lubricant from the lubricant source S into the actuation chamber 122a. The injecting of the actuation fluid into the actuation chamber 122a includes moving the spool valve 126 from the first position in which fluid communication between the source S of the actuation fluid and the actuation chamber 122a is limited to the second position in which the source S of the actuation fluid is hydraulically connected to the actuation chamber 122a.

In the embodiment shown, the moving of the valve 126 includes electrifying the electromagnet 128. The moving of the valve 126 includes, magnetically moving the valve 126 from the first position to the second position. In the embodiment shown, the ECU 112 receives signal from a second electromagnet 129 disposed around the spool valve 126; the signal indicated to the ECU 112 if the spool valve 126 was effectively moved to the desired one of the first and second positions by the electromagnet 128. If the ECU 112 determines that the spool valve 126 was not moved to the desired one of the first and second positions based on the signal received from the second electromagnet 129, the ECU 112 moves the spool valve 126 to the desired one of the first and second positions by electrifying the second electro magnet 129.

Embodiments disclosed herein include:

A. A rotary internal combustion engine (ICE) comprising: a housing defining a rotor cavity; a rotor rotationally received within the rotor cavity to define a plurality of working chambers of variable volume around the rotor, the rotor having circumferentially spaced peripheral apex seals biased radially outwardly in sliding engagement against a peripheral wall of the housing to separate the working chambers from one another, the housing having a fluid passage defined therethrough and opening into an inner surface of the peripheral wall; and an injector having a lubricant inlet hydraulically connected to a lubricant source, an actuation inlet hydraulically connected to a source of an actuation fluid, and a lubricant outlet, the injector having an open state in which the lubricant outlet is in fluid flow communication with the fluid passage upon the actuation fluid received within the injector and a closed state in which the lubricant outlet is disconnected from the fluid passage.

Embodiment A may include any of the following elements, in any combinations:

Element 1: the actuation fluid is the lubricant, the actuation inlet hydraulically connected to lubricant source. Element 2: the injector has a body, a nozzle protruding from the body, and a needle slidingly received within the nozzle, the needle movable from an engaged position corresponding to the closed state of the injector and in which the needle is sealingly engaged to the nozzle and a second position corresponding to the open state of the injector and in which the needle is offset from the lubricant outlet and allows the lubricant to flow out of the injector via the lubricant outlet. Element 3: the body of the injector defines an actuation chamber hydraulically connected to the actuation inlet and an injection chamber hydraulically connected to the lubricant inlet, a first piston slidingly received within the actuation chamber, a second piston slidingly received within the injection chamber and connected to the needle, movement of the first piston upon reception of the actuation fluid within the actuation chamber pushing the lubricant received via the lubricant inlet into the injection chamber thereby pushing on the second piston to move the needle from the engaged position toward the disengaged position. Element 4: a low-pressure pump hydraulically connected to the lubricant source, the lubricant inlet and the actuation inlet hydraulically connected to the low-pressure pump. Element 5: the first piston is connected to a shank slidingly received within an internal passage of the body of the injector, the internal passage hydraulically connected to the lubricant inlet and to the injection chamber, a cross-sectional area of the first piston taken along a plane normal to the injector axis greater than that of the shank. Element 6: the lubricant outlet of the injector is in fluid flow communication with a manifold defined in the housing, the fluid passage being in fluid communication with the manifold. Element 7: the fluid passage is an elongated slot extending along an axial direction of the housing, or wherein the fluid passage includes a plurality of apertures extending through the peripheral wall, each of the plurality of apertures hydraulically connected to the manifold. Element 8: a pressure at the lubricant inlet corresponds to a pressure at the actuation inlet. Element 9: an engine control unit (ECU) operatively connected to one or more sensors of the rotary engine, the ECU having a processing unit and a computer readable medium contain instructions executable by the processing unit for: receiving data from the one or more sensors; determining a lubrication profile required by the apex seals in function of the received data; and injecting lubricant at the apex seals via the injector per the determined injection profile. Element 10: the determining the lubrication profile includes determining a frequency of injection of the lubricant and an amount of lubricant to be injected, the injecting the lubricant includes injecting the determined amount of the lubricant at the determined frequency. Element 11: the injecting the lubricant includes: injecting the actuation fluid into an actuation chamber of the injector; pushing on a first piston with the injected actuation fluid; pushing the lubricant received in the injector via the lubricant inlet into an injection chamber with the first piston; pushing on a second piston with the pushed lubricant; and moving a needle with the second piston to allow the lubricant to exit the injector via the lubricant outlet. Element 12: the injecting of the actuation fluid into the actuation chamber includes injecting the lubricant from the lubricant source into the actuation chamber. Element 13: the injecting of the actuation fluid into the actuation chamber includes moving a valve from a first position in which fluid communication between the source of the actuation fluid and the actuation chamber is limited to a second position in which the source of the actuation fluid is hydraulically connected to the actuation chamber. Element 14: the moving of the valve includes electrifying an electromagnet, the moving of the valve includes, magnetically moving the valve from the first position to the second position.

B. A method of lubricating apex seals of a rotor of a rotary internal combustion engine having a housing defining a cavity rotationally receiving the rotor, the apex seals biased against the housing, the method comprising: receiving lubricant within an injector hydraulically connected to a fluid passage defined through the housing; pushing the received lubricant out of an lubricant outlet of the injector with an actuation fluid received within the injector; and injecting the received lubricant into the fluid passage defined through the housing.

Embodiment B may include any of the following elements, in any combinations:

Element 15: the pushing of the received lubricant includes: injecting the actuation fluid into an actuation chamber of the injector; pushing on a first piston with the injected actuation fluid; pushing the lubricant received in the injector into an injection chamber with the first piston; pushing on a second piston with the pushed lubricant; and moving a needle with the second piston to allow the lubricant to exit the injector to lubricate the apex seals. Element 16: the pushing of the received lubricant includes increasing a pressure of the received lubricant within the injector. Element 17: the injecting of the actuation fluid into the actuation chamber includes injecting the lubricant into the actuation chamber. Element 18: the injecting of the actuation fluid into the actuation chamber includes moving a valve from a first position in which fluid communication between a source of the actuation fluid and the actuation chamber is limited to a second position in which the source of the actuation fluid is hydraulically connected to the actuation chamber.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A rotary internal combustion engine (ICE) comprising: a housing defining a rotor cavity; a rotor rotationally received within the rotor cavity to define a plurality of working chambers of variable volume around the rotor, the rotor having circumferentially spaced peripheral apex seals biased radially outwardly in sliding engagement against a peripheral wall of the housing to separate the working chambers from one another, the housing having a fluid passage defined therethrough and opening into an inner surface of the peripheral wall; and an injector having a lubricant inlet hydraulically connected to a lubricant source, an actuation inlet hydraulically connected to a source of an actuation fluid, and a lubricant outlet, the injector having an open state in which the lubricant outlet is in fluid flow communication with the fluid passage upon the actuation fluid being received within the injector and a closed state in which the lubricant outlet is disconnected from the fluid passage, the injector having a valve movable from a first position corresponding to the closed state to a second position corresponding to the open state, a first electromagnet operable to move the valve between the first position and the second position, and a backup electromagnet operable to move the valve between the first position and the second position.

2. The ICE of claim 1, wherein the actuation fluid is the lubricant, the actuation inlet hydraulically connected to the lubricant source.

3. The ICE of claim 1, wherein the injector has a body, a nozzle protruding from the body, and a needle slidingly received within the nozzle, the needle movable from an engaged position corresponding to the closed state of the injector and in which the needle is sealingly engaged to the nozzle and a second position corresponding to the open state of the injector and in which the needle is offset from the lubricant outlet and allows the lubricant to flow out of the injector via the lubricant outlet.

4. The ICE of claim 3, wherein the body of the injector defines an actuation chamber hydraulically connected to the actuation inlet and an injection chamber hydraulically connected to the lubricant inlet, a first piston slidingly received within the actuation chamber, a second piston slidingly received within the injection chamber and connected to the needle, movement of the first piston upon reception of the actuation fluid within the actuation chamber pushing the lubricant received via the lubricant inlet into the injection chamber thereby pushing on the second piston to move the needle from the engaged position toward the disengaged position.

5. The ICE of claim 4, comprising a low-pressure pump hydraulically connected to the lubricant source, the lubricant inlet and the actuation inlet hydraulically connected to the low-pressure pump.

6. The ICE of claim 4, wherein the first piston is connected to a shank slidingly received within an internal passage of the body of the injector, the internal passage hydraulically connected to the lubricant inlet and to the injection chamber, a cross-sectional area of the first piston taken along a plane normal to the injector axis greater than that of the shank.

7. The ICE of claim 1, wherein the lubricant outlet of the injector is in fluid flow communication with a manifold defined in the housing, the fluid passage being in fluid communication with the manifold.

8. The ICE of claim 7, wherein the fluid passage is an elongated slot extending along an axial direction of the housing, or wherein the fluid passage includes a plurality of apertures extending through the peripheral wall, each of the plurality of apertures hydraulically connected to the manifold.

9. The ICE of claim 5, wherein a pressure at the lubricant inlet corresponds to a pressure at the actuation inlet.

10. The ICE of claim 1, comprising an engine control unit (ECU) operatively connected to one or more sensors of the rotary engine, the ECU having a processing unit and a computer readable medium comprising instructions executable by the processing unit for:
receiving data from the one or more sensors;
determining a lubrication profile required by the apex seals as function of the received data; and
injecting lubricant at the apex seals via the injector per the determined injection profile.

11. The ICE of claim 10, wherein the determining the lubrication profile includes determining a frequency of injection of the lubricant and an amount of lubricant to be injected, the injecting the lubricant includes injecting the determined amount of the lubricant at the determined frequency.

12. The ICE of claim 10, wherein the injecting the lubricant includes:
injecting the actuation fluid into an actuation chamber of the injector;
pushing on a first piston with the injected actuation fluid;
pushing the lubricant received in the injector via the lubricant inlet into an injection chamber with the first piston;
pushing on a second piston with the pushed lubricant; and
moving a needle with the second piston to allow the lubricant to exit the injector via the lubricant outlet.

13. The ICE of claim 12, wherein the injecting of the actuation fluid into the actuation chamber includes injecting the lubricant from the lubricant source into the actuation chamber.

14. The ICE of claim 12, wherein the injecting of the actuation fluid into the actuation chamber includes moving the valve from the first position in which fluid communication between the source of the actuation fluid and the actuation chamber is limited to the second position in which the source of the actuation fluid is hydraulically connected to the actuation chamber.

15. The ICE of claim 14, wherein the moving of the valve includes electrifying the first electromagnet, the moving of the valve includes, magnetically moving the valve from the first position to the second position.

16. A method of lubricating apex seals of a rotor of a rotary internal combustion engine having a housing defining a cavity rotationally receiving the rotor, the apex seals biased against the housing, the method comprising:
receiving lubricant within an injector hydraulically connected to a fluid passage defined through the housing;
opening a valve with an electromagnet from a first position in which the valve prevents the lubricant from reaching the fluid passage to a second position in which the valve permits the lubricant to reach the fluid passage;
sending a signal indicative that the valve successfully moved from the first position to the second position with a second electromagnet operatively connected to the valve, the second electromagnet operable to move the valve between the first position and the second position;

pushing the received lubricant out of a lubricant outlet of the injector with an actuation fluid received within the injector; and injecting the received lubricant into the fluid passage defined through the housing.

17. The method of claim 16, wherein the pushing of the received lubricant includes:

injecting the actuation fluid into an actuation chamber of the injector;

pushing on a first piston with the injected actuation fluid;

pushing the lubricant received in the injector into an injection chamber with the first piston;

pushing on a second piston with the pushed lubricant; and moving a needle with the second piston to allow the lubricant to exit the injector to lubricate the apex seals.

18. The method of claim 16, wherein the pushing of the received lubricant includes increasing a pressure of the received lubricant within the injector.

19. The method of claim 17, wherein the injecting of the actuation fluid into the actuation chamber includes injecting the lubricant into the actuation chamber.

20. The method of claim 17, wherein the injecting of the actuation fluid into the actuation chamber includes moving a valve from a first position in which fluid communication between a source of the actuation fluid and the actuation chamber is limited to a second position in which the source of the actuation fluid is hydraulically connected to the actuation chamber.

\* \* \* \* \*